United States Patent
Hoover et al.

(10) Patent No.: US 10,634,484 B2
(45) Date of Patent: Apr. 28, 2020

(54) ARRANGEMENT AND A METHOD FOR INSPECTING THE CONDITION OF A CHAIN

(71) Applicant: KONECRANES GLOBAL CORPORATION, Hyvinkää (FI)

(72) Inventors: Jack Hoover, Hyvinkää (FI); Lasse Eriksson, Espoo (FI); Teemu Puustinen, Nurmijärvi (FI); Risto Vilppo, Riihimäki (FI); Kimmo Rantala, Hyvinkää (FI); Juhani Kerovuori, Loppi (FI); Stefan Hecht, Beuren (FI)

(73) Assignee: KONECRANES GLOBAL CORPORATION, Hyvinkää (FI)

( * ) Notice: Subject to any disclaimer, the term of this patent is extended or adjusted under 35 U.S.C. 154(b) by 139 days.

(21) Appl. No.: 15/742,347

(22) PCT Filed: Jul. 5, 2016

(86) PCT No.: PCT/FI2016/050502
§ 371 (c)(1),
(2) Date: Jan. 5, 2018

(87) PCT Pub. No.: WO2017/005986
PCT Pub. Date: Jan. 12, 2017

(65) Prior Publication Data
US 2018/0195854 A1    Jul. 12, 2018

(30) Foreign Application Priority Data
Jul. 6, 2015    (FI) .................................. 20155535

(51) Int. Cl.
*G01B 11/00* (2006.01)
*G01B 11/02* (2006.01)
(Continued)

(52) U.S. Cl.
CPC ............ *G01B 11/022* (2013.01); *B66C 15/00* (2013.01); *F16G 13/12* (2013.01); *G01B 11/02* (2013.01);
(Continued)

(58) Field of Classification Search
CPC ........ B65G 2203/042; B65G 2203/044; G01B 11/043; G01B 11/04; G01B 11/02;
(Continued)

(56) References Cited

U.S. PATENT DOCUMENTS

| | | | | |
|---|---|---|---|---|
| 5,482,154 A | * | 1/1996 | Affeldt | B07C 5/361 198/370.04 |
| 5,563,392 A | * | 10/1996 | Brown | B65G 43/02 235/91 R |

(Continued)

FOREIGN PATENT DOCUMENTS

| FR | 2703769 A1 | 10/1994 |
|---|---|---|
| JP | 61-120909 A | 6/1986 |

(Continued)

OTHER PUBLICATIONS

Japanese Office Action, dated Jan. 9, 2019, for Japanese Application No. 2018-520656, along with an English translation.
(Continued)

*Primary Examiner* — Jingge Wu
(74) *Attorney, Agent, or Firm* — Birch, Stewart, Kolasch & Birch, LLP

(57) ABSTRACT

There is provided a fast and a reliable way to inspect a condition of a chain by an arrangement comprising a camera and guide for positioning a chain in front of the camera such that holes of consecutive chain links are visible to the camera. In a method for inspecting a chain connected movable to a hoisting device, the chain is positioned in front (Continued)

of the camera by the guide and the chain is driven past the camera by the hoisting device.

20 Claims, 3 Drawing Sheets

(51) Int. Cl.
| | | |
|---|---|---|
| *G01L 5/105* | (2020.01) | |
| *G06K 9/46* | (2006.01) | |
| *B66C 15/00* | (2006.01) | |
| *G01L 5/04* | (2006.01) | |
| *F16G 13/12* | (2006.01) | |
| *G01N 21/952* | (2006.01) | |
| *G01N 21/95* | (2006.01) | |
| *G01C 11/02* | (2006.01) | |
| *G01B 11/06* | (2006.01) | |
| *G06T 7/00* | (2017.01) | |

(52) U.S. Cl.
CPC .............. *G01B 11/06* (2013.01); *G01C 11/02* (2013.01); *G01L 5/047* (2013.01); *G01L 5/105* (2013.01); *G01N 21/95* (2013.01); *G01N 21/952* (2013.01); *G06K 9/46* (2013.01); *G06T 7/0002* (2013.01); *G06T 2207/30242* (2013.01)

(58) Field of Classification Search
CPC .... G01B 11/022; G01B 11/0691; G01B 7/02; G01B 11/06; G01C 11/02; G01L 5/047; G01L 5/105; G01N 21/95; G01N 21/952; G06K 9/46; G06T 7/0002
See application file for complete search history.

(56) References Cited

U.S. PATENT DOCUMENTS

| | | | | |
|---|---|---|---|---|
| 6,862,939 | B2* | 3/2005 | Frost | .................. G01M 13/023 |
| | | | | 73/828 |
| 2004/0226805 | A1* | 11/2004 | Lodge | .................... B65G 43/02 |
| | | | | 198/810.02 |
| 2004/0244354 | A1 | 12/2004 | Sinz et al. | |
| 2008/0047804 | A1* | 2/2008 | Rathbun | ................. B65G 43/02 |
| | | | | 198/502.1 |
| 2009/0245616 | A1 | 10/2009 | De La Ballina et al. | |
| 2011/0093218 | A1 | 4/2011 | Vozner | |
| 2012/0269447 | A1 | 10/2012 | Kouno | |
| 2013/0070080 | A1* | 3/2013 | Saucier | .................. H04N 7/183 |
| | | | | 348/88 |
| 2015/0226582 | A1* | 8/2015 | Siraky | .................. G01D 5/2013 |
| | | | | 324/207.15 |

FOREIGN PATENT DOCUMENTS

| | | | |
|---|---|---|---|
| JP | 62-145105 A | 6/1987 | |
| JP | 9-304037 A | 11/1997 | |
| JP | 10-300426 A | 11/1998 | |
| JP | 2000-88526 A | 3/2000 | |
| JP | 2000-111318 A | 4/2000 | |
| JP | 3066412 B2 | 7/2000 | |
| JP | 2006-317359 A | 11/2006 | |
| WO | WO 2008/024685 A2 | 2/2008 | |
| WO | WO 2011/117720 A1 | 9/2011 | |
| WO | WO 2014/199376 A1 | 12/2014 | |

OTHER PUBLICATIONS

Supplementary European Search Report, dated Jan. 21, 2019, for European Application No. 16820902.

International Preliminary Report on Patentability, issued in PCT/FI2016/050502, PCT/IPEA/409, dated Nov. 8, 2017.

International Search Report, issued in PCT/FI2016/050502, dated Oct. 5, 2016.

Office Action issued in Finnish Patent Application No. 20155535 dated Jul. 12, 2017.

Office Action issued in Finnish Patent Application No. 20155535 dated Mar. 1, 2016.

Search Report issued in Finnish priority application 20155535, dated Mar. 1, 2016.

Written Opinion of the International Searching Authority, issued in PCT/FI2016/050502, dated Oct. 5, 2016.

* cited by examiner

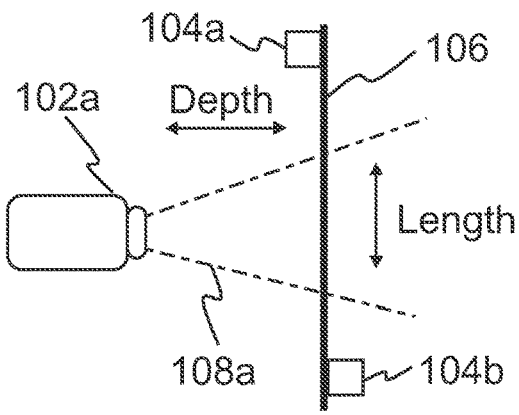
Figure 1a
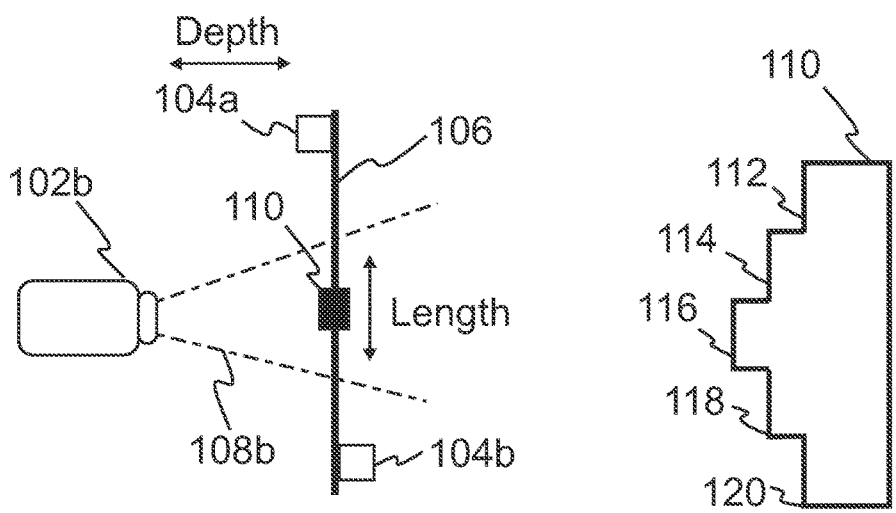
Figure 1b
Figure 1c
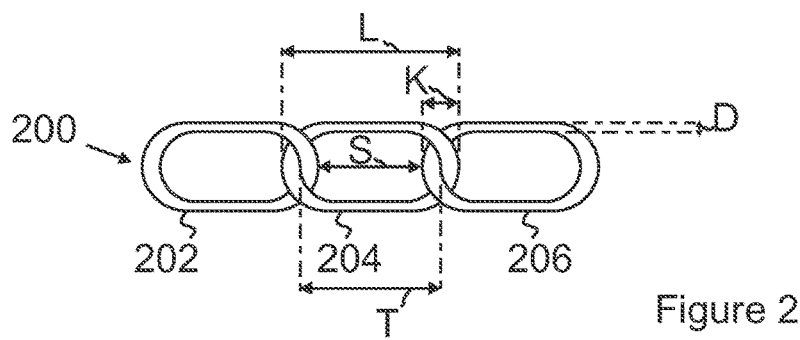
Figure 2

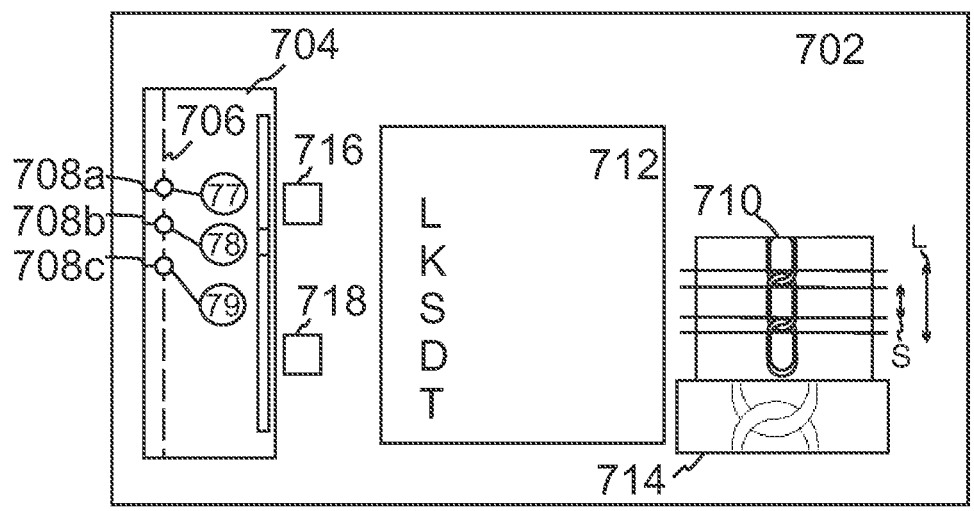
Figure 7
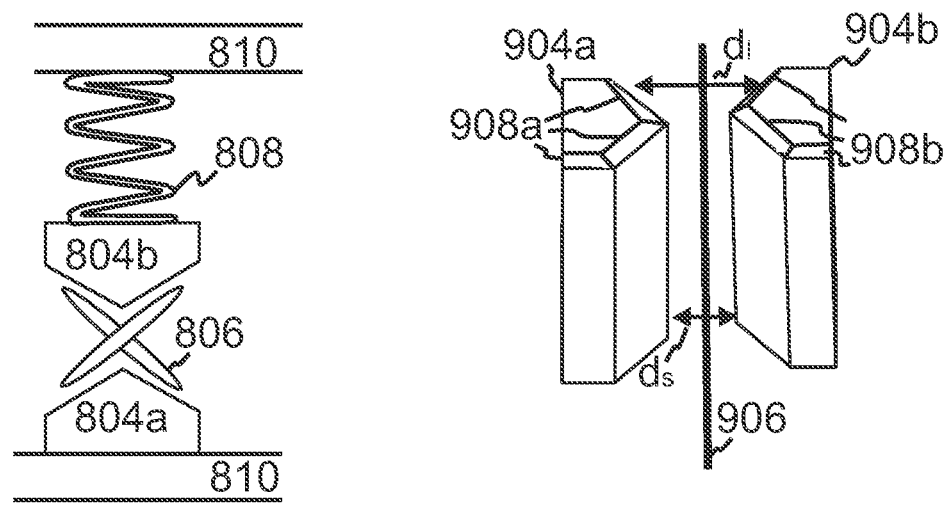
Figure 8
Figure 9
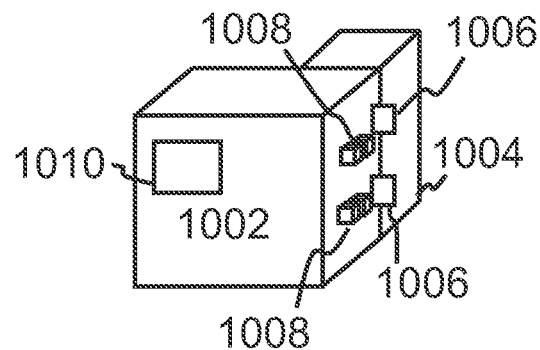
Figure 10

ARRANGEMENT AND A METHOD FOR INSPECTING THE CONDITION OF A CHAIN

FIELD

The invention relates to inspecting a condition of a chain.

BACKGROUND

Chains are used in many areas of industry. In hoisting devices chains are used to attach hoisting devices to loads for hoisting the load. Hoisting devices are used in cranes for example.

Condition of the chains should be inspected to avoid interruption of industrial production processes due to broken chains. In a typical condition inspection of a chain a service technician inspects the chain visually by hand. In addition to the visual inspection, the chain condition can be evaluated by using a special tool for measuring the length of eleven or more consecutive chain links. If the total length of these measured chain links exceeds the set limits, the chain must be replaced.

However, since the typical inspection is based on the measurement of the length of eleven or more chain links, individual chain links can be dangerously worn without being identified. Manual inspection by special tools introduces inaccuracies and a high possibility of errors. These problems with manual inspection can be particularly likely if the service technician performing the inspection is not familiar with the application area of the machinery, where the chain is installed, and has little experience of inspecting the chains. Due to the manual method for inspecting chains, even experienced technicians may give different opinions on the condition of a specific chain.

BRIEF DESCRIPTION

An object of the present invention is to provide an arrangement and a method for inspecting a condition of a chain so as to alleviate at least part of the above disadvantages. The objects of the invention are achieved by a method and an arrangement which are characterized by what is stated in the independent claims. The preferred embodiments of the invention are disclosed in the dependent claims.

One or more examples of implementations are set forth in more detail in the accompanying drawings and the description below. Other features will be apparent from the description and drawings, and from the claims.

Some embodiments allow a fast and a reliable way to inspect a condition of a chain.

BRIEF DESCRIPTION OF THE DRAWINGS

In the following the invention will be described in greater detail by means of preferred embodiments with reference to the attached drawings, in which FIGS. 1a and 1b illustrate arrangements according to embodiments;

FIG. 1c is a front view of the reference element of FIG. 1b;

FIG. 2 illustrates an example of chain for an embodiment;

FIG. 4b is a front view of the arrangement of FIG. 4a;

FIG. 7 illustrates a user interface in an arrangement according to an embodiment;

FIGS. 8 and 9 illustrate examples of guiding means according to embodiments; and FIG. 10 illustrate a structure of arrangement according to an embodiment.

DETAILED DESCRIPTION

Figure 3:
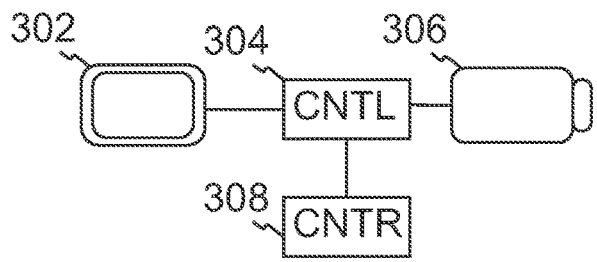
FIG. 3 is a block diagram of an arrangement according to an embodiment.

Various embodiments described herein may be applied for inspecting condition of chains in many areas of industry. Chains are used in load handling devices such as cranes for hoisting loads. Moreover, condition of the chains may be inspected in manufacturing the chains.

FIGS. 1a and 1b illustrate arrangements according to embodiments. The arrangements comprise a camera 102a, 102b and guiding means 104a, 104b for positioning a chain 106 in front of the camera such that holes of consecutive chain links are visible to the camera. The camera may have an imaging area 108a, 108b. The imaging area is illustrated by dashed lines in the FIGS. 1a and 1b. When the chain is in front of the camera and within the imaging area of the camera, the camera may generate an image of the chain. The imaging area may be defined by a range of the camera in a length direction 'Length' of the chain and by a distance between the camera and the chain. In FIGS. 1a and 1b the arrangements are illustrated as a side view, where the chain is extended in a vertical direction. The distance between the camera and the chain may be referred to as a depth direction 'Depth'. The chain outside the imaging area defined by the dashed lines may not be visible in the image generated by the camera. Similarly, when the chain is outside the range of the camera in the depth direction, the chain may not be visible in the image generated by the camera or the image of the chain may be impaired. In one example, the camera may have a focus point at a specific distance in the depth direction. If the chain is not positioned in the focus point, the image generated from the chain may be impaired.

In condition inspection of the chain according to an embodiment, the chain 106 may be moved in front of the camera 102a, 102b and past the guiding means in the 'Length' direction. The camera may generate images of the chain links of the chain such that one or more characteristics of individual chain links may be measured from the images.

As a difference to the arrangement illustrated in FIG. 1a, the arrangement in FIG. 1b illustrates a reference element 110. FIG. 1c illustrates a front view of the reference element of FIG. 1b. The front view of the reference element may be for example the reference element as viewed from the camera towards the chain in the depth direction. The reference element provides that the arrangement is particularly suitable for measuring characteristics of the chain links using absolute values of the characteristics. The reference element may be a plate. The reference element is located in the imaging area of the camera, whereby the reference element and the chain links may be visible in the images generated by the camera. Accordingly, the reference element may be positioned in front of the camera and with respect to the chain in front of the camera such that one or more reference edges 112, 114, 116, 118, 120 in the reference element are aligned to the chain for measuring one or more characteristics of the chain links including at least one of a gap, a link length and a thickness.

Lengths of the reference edges may have a lengths defined by a desired characteristic of the chain. The desired characteristic of the chain may comprise characteristics of individual chain links, consecutive chain links and/or the whole chain. Examples of the characteristics of a single chain link of the chain comprise a gap, a link length and a thickness. One or more of the characteristics may be measured for a single chain link. Characteristics for consecutive chain links may be obtained by measuring characteristics of more than one chain links that are connected in series. The characteristics of the whole chain may be obtained by measuring characteristics of all the chain links that are connected in series and form the chain. Desired characteristics of the chain links may be defined by a standard. The standard may be an industry standard or a customer specific standard.

One or more reference edges of the reference element that have lengths defined by a desired characteristic provide that the reference edge may serve as a scale for inspecting a condition of the chain, when images of the chain are generated using the camera.

Preferably the reference element may be aligned with respect to the chain such that the reference element is at the same distance from the camera as the chain. In this way the reference edges of the reference elements and the chain have substantially the same scale in images generated by the camera. In one example the reference element may be positioned at the same distance from the camera with the centre point of the chain. The centre point of the chain may be located on a vertical axis of the chain, when the chain is extended. In one example each of the edges may have 1 cm length. The length of the reference edges may be defined as pixels in an image generated by the camera.

FIG. 2 illustrates an example of chain 200 for an embodiment. The chain may have a plurality of consecutive chain links 202, 204, 206. Each chain link may be formed by an elongated piece of material that is formed into a loop. Consecutive chain links may be interconnected by loops of the consecutive chain links, whereby the loops of the consecutive chain links travel through holes formed by the loops. Accordingly, the holes of the loops may be at least partly overlapping.

During use, the chain may be extended to its whole length. In a mint condition, e.g. a new chain, the length of the chain may substantially correspond to a specified nominal length of the chain. However, the length of the chain may vary depending on the condition of the chain. Accordingly, chain that has been used for hoisting loads by a hoisting device may have a substantially greater length than the nominal length of the chain.

The condition of the chain may be measured by characteristics that may include at least one of a gap, a link length and a thickness. When a chain link of the chain is worn, the thickness of the material forming the chain link may be less than in a new chain and/or the length of the chain link may be greater than the length of a new chain. The gap and the link length of the chain link may be measured for a single chain link for determining whether the length of the chain link has been increased. The thickness of the chain link may be measured for determining whether the thickness of the material in the chain link has been decreased.

The decrease in the thickness of the chain link may be caused by stress experienced by the chain link during its use, e.g. when the chain has been used for lifting heavy loads. Portions of the chain link may be in contact with other chain links during use of the chain, whereby the contact portions may be worn by movement of the chain links with respect to each other. Since the chains may be used in dirty environments, dirt may accumulate to the chain links which may lead to increased wear of the chain links in the contact portions. The amount of stress experienced by the chain may further increase the wear of the chain links at the portions, where the chain links contact other chain links during use of the chain.

The characteristics of the whole chain may be obtained by measuring characteristics of all the chain links that are connected in series and form the chain. Desired characteristics of the chain may be defined by a standard. The standard may define that the condition of the chain should meet specific values for the characteristics such that the chain would be safe to use e.g. for hoisting loads. The standard may be an industry standard or a customer specific standard.

Examples of the characteristics are illustrated in FIG. 2 and include:

L—Chain Link length. This is the total length of the chain link

K—Connection thickness of consecutive chain links

D—Longitudinal thickness

S—Gap

T—Hole length of the Chain link

The link length of a chain link may refer to a chain link length 'L' and/or to a hole length 'T' of the loop of the chain link. The chain link length 'L' may be the total length of the chain link and the hole length 'T' may be the length of the hole formed by the looped material of the single chain link. When the chain link is worn, the chain link length and the hole length may be greater than in a new chain. A difference between the chain link length and the hole length indicate wear of the portions of the chain link that are in contact to another chain link, when the chain is in use.

The gap 'S' may refer to a length of the hole formed by the looped material of the measured chain link and consecutive chain links connected to the chain link. The length of the hole may be measured between portions of the chain link that are in contact to the consecutive chain links. Accordingly, the gap 'S' includes thickness of the loops of the consecutive chain links and the loop of the measured chain link.

Thickness of a single chain link may be measured for thickness in terms of a longitudinal thickness 'D' of the loop and/or a chain link interconnection thickness 'K'. The chain link interconnection thickness 'K' may include a thickness of the loop of the single chain link and a thickness of the loop of a consecutive chain link connected to the chain link.

It should be appreciated that only a part of the above characteristics may need to be measured for a chain link for example depending on the type of the chain. The type of the chain may be defined by the form of the loops for example.

FIG. 3 is a block diagram of an arrangement according to an embodiment. A chain may be positioned in front of the camera 306 such that holes of consecutive chain links are visible to the camera. In this way images may be taken from the chain and the portions of the chain link in contact with other chain links are visible to the camera. The chain may be positioned according to the examples of FIGS. 1a and 1 b. The blocks may be implemented as separate entities or blocks may be combined into a single entity. The arrangement may comprise a display 302, a camera 306 and a counter 308 that may be connected to a controller (CNTL) 304 such as a processor. The processor may be caused to control the display, camera and/or counter to cause the camera to take images from individual chain links of consecutive chain links in the chain. The images taken by the camera may be displayed on the display as individual images or as a series of overlapping images. The connections between the blocks of the arrangement may provide transfer of information including signals, images, user interface data, chain link number, data and/or commands between the blocks for executing functionalities according to an embodiment. Suitable connections comprise electrical connections for example a computer bus and video interfaces such as High-Definition Multimedia Interface (HDMI) and Video Graphic Array (VGA) interfaces.

The arrangement may inspect a condition of a chain by determining one or more characteristics of individual chain links of the chain. Examples of the characteristics are described with reference to FIG. 2 above. The characteristics may be determined on the basis of the images taken by the camera 306 from the chain. The images may form a series of images representing the chain. The series of images may be formed by combining overlapping images taken by the camera. The characteristics for each chain link may be measured from the images. Image processing algorithms may be utilized to process the images and to derive the characteristics from the images. The characteristics obtained from the images may be compared to desired characteristics of the chain links for determining a condition of each individual chain link. If the desired characteristics are met, the chain link may be determined to be in a good condition. If the desired characteristics are not met, the chain link may be determined to be in a poor condition and it should be replaced. The characteristics may have more than one value that each may correspond to a different condition of the chain link.

Further embodiments are now described with reference to the items of FIG. 3. In an arrangement according to an embodiment a chain may be positioned in front of a camera 306 such that holes of consecutive chain links are visible to the camera. The arrangement may comprise a counter 308 for counting chain links in the chain. The camera may be operatively connected to the counter such that the camera is caused to take overlapping images from the chain links on update of the counter. In this way the camera may be timed correctly such that images may be taken by the camera from the individual chain links of the chain travelling past the camera. Accordingly, on update of the counter, at least one whole chain link and a portion of another chain link may be in the imaging area of the camera for obtaining overlapping images form the chain links. The overlapping images provide that each chain link is present in more than one image taken by the camera such that the possibility of not inspecting a single chain link may be avoided.

In an embodiment, an arrangement comprises an optical device that may serve as the counter 308 for counting chain links in the chain. The optical device may be capable of emitting a light beam, for example of laser light, and disconnection of the light beam may cause controlling a camera to take images from the chain links. The images may be non-overlapping or overlapping images, for example. The optical device may be capable of generating the light beam on a travel path of the chain positioned in front of the camera such that a chain link travelling past the optical device causes the light beam to be disconnected. The disconnection of the light beam may be used to control the camera to take images from the chain links. In this way, the disconnection of the light beam may effectively be used as a counter. The optical device may comprise a light source capable of emitting a light beam and a light receiver capable of receiving the light beam from the light source. In one example the light source and the light receiver are arranged on opposite sides of the chain. However, the light source and light receiver may be located on the same side of the chain if the optical device comprises a reflector on the opposite side of the chain light such that light from the light source may be reflected from the reflector to the light receiver.

It should be appreciated that also other devices may serve as the counter and thereby the counter may be formed by one or more such devices Examples of such devices comprise devices that are capable of sensing a chain. These devices may comprise photocells, ultrasound devices and magnetic switches.

In an embodiment, a controller (CNTL) 304 may be operatively connected to a camera 306 and a counter (CNTR) 308 to cause the camera to take overlapping images from the chain links on update of the counter. The update of the CNTR may be determined on the basis of information indicating a new chain link received from the CNTR. Accordingly, the CNTL may receive from the CNTR information indicating a new chain link in front of the camera. After the CNTL has received the information indicating the new chain link in front of the camera, the CNTL may control the camera to take an image of the new chain link. The information indicating the new chain link may comprise a value indicating a number of the chain link, whereby the number of the chain link may be maintained in the CNTR. On the other hand the information indicating the new chain link may be a signal indicating a change in the CNTR. Such a signal may be a bit value including only a single bit, '1' or '0', whereby a change of the bit indicates a new chain link.

It should be appreciate that in an embodiment the CNTR may be omitted provided that the camera has a frame rate sufficient with respect to the speed of the chain for taking overlapping images from the chain links. The frame rate of the camera defines the speed of taking images from the chain, whereby overlapping images may be taken from the chain by adapting the frame rate and the speed of the chain to each other.

On the other hand, for taking overlapping images from the chain links, the camera may have an imaging area that may be set such that the imaging area includes more than one consecutive chain links. The setting may be achieved for example by positioning the camera at a suitable distance from the chain. Consequently, an image taken by the camera every time the CNTR is updated includes at least a portion of the chain links in the previous image. In this way the camera may take overlapping images from the chain links on update of the CNTR.

In an embodiment a controller (CNTL) 304 may be operatively connected to a camera 306 to receive images taken by the camera from the chain. The CNTL may be caused to determine, on the basis of the received images, for each chain link one or more characteristics including at least one of a gap, a link length and a thickness. The arrangement may comprise a counter (CNTR) for counting chain links in the chain, and a display 302 operatively connected to the counter such that the display is caused to display a counter value for the chain link and the determined characteristics of the chain link.

The characteristics of the chain link are illustrated in FIG. 2. The characteristics may be determined by measurements of the characteristics in the images taken by the camera 306. The characteristics may be measured as absolute values or relative values. The absolute values may be measured, when the arrangement has a reference element in the imaging area of the camera, for example as illustrated in FIG. 1*b*. The relative values may be measured by comparing images of individual chain links with each other.

The CNTL may determine the counter value on the basis of an update of the counter. The update of the CNTR may be performed as described in the embodiment above. Accordingly, the CNTL may receive a number of the chain link from the CNTR. On the other hand or the CNTL may receive a signal indicating a change in the CNTR. The CNTL may maintain a current number of the chain link and update the current number of the chain link maintained by the CNTL. Then, the CNTL may generate a signal including the number of the chain link and the determined characteristics to the display. In this way the number and characteristics of the current chain link in front of the camera may be displayed to the personnel inspecting the chain. Movement of the chain in front of the camera may cause new chain links to be visible to the camera and updating of the CNTR. Consequently, the number of the chain link may be shown on the display. The number of the chain link maybe updated on the display and progress of the chain in front of the camera may be followed on the display. It should be appreciated that the characteristics may not necessarily be displayed at the same time as the counter value. The counter value may be displayed substantially concurrently as the images are taken by the camera. Thereby, the chain may be driven through the arrangement without delay from the image processing. The images may be analysed after all the images are taken or started during images are taken from the chain. The analysis may be complete later after which the characteristics may be displayed. FIG. 7 illustrates an example of the displayed information including the characteristics.

Figure 4A:
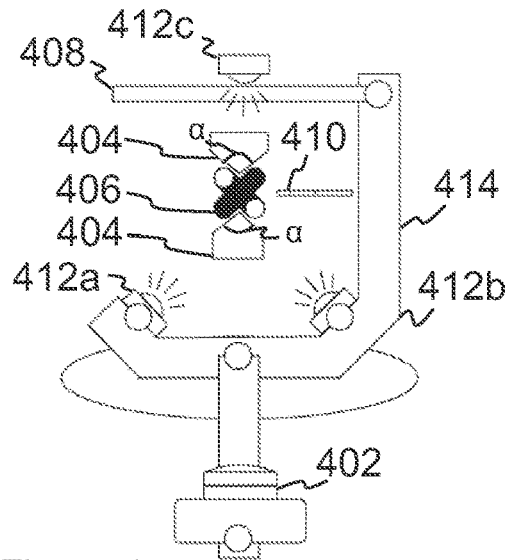
FIG. 4a is a top view of an arrangement according to an embodiment.
Figure 4B:
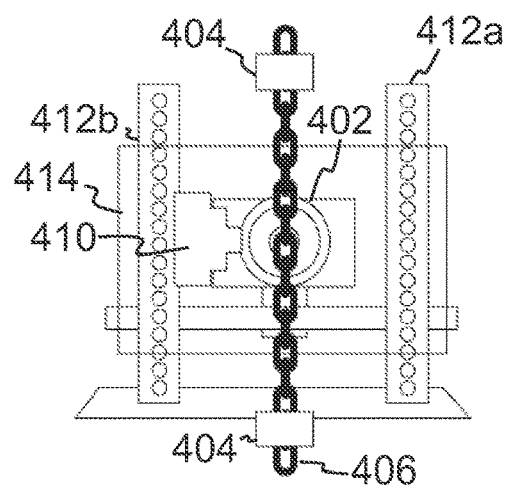

FIG. 4a is a top view of an arrangement according to an embodiment and FIG. 4b is a front view of the arrangement of FIG. 4a. The arrangement may comprise a camera 402, guiding means 404, for a chain 406, a back plate 408, a reference element 410 and light sources 412a, 412b 412c. The items of the arrangement may be arranged on a support structure 414 such that images, where holes of consecutive chain links are visible, may be taken by the camera.

The back plate may be arranged on an opposite side of the chain than the camera such that images taken by the camera from the chain have the back plate as background. In this way measurements of the chain link from the image may be performed with a constant background. The back plate may have preferably a high colour contrast to the chain in order to facilitate accurate measurements of characteristics of the chain links from the images. The back plate may be of white colour to provide the high contrast. The white colour of the back plate also supports illumination of the chain from the back plate's side of the chain.

Preferably the back plate is arranged at a distance beyond a focus point of the camera. In this way, the camera may be prevented from focusing to the back plate instead of the chain. Focusing the camera to the back plate may be further prevented by making the back plate of uniform material and keeping the back plate clean from marks dirt, or stains. The camera may focus to the back plate particularly to other points than the chain if the camera has autofocus functionality. In order to avoid error in focusing the camera, the autofocus may be turned off and the camera may be focused manually or a camera without the autofocus functionality may be used. A camera without the autofocus functionality may be a camera having a fixed focus point or functionality for manually focusing the camera.

At least two light sources 412a, 412b, may be arranged next to the camera and directed to the chain and at least one light source 412c may be arranged to illuminate the back plate. Preferably the back plate has a substantially greater area than the light source as viewed from the camera. The back plate preferably distributes the light from the light source to the area of the back plate. In this way the chain may be illuminated evenly such that no shadows are formed in the imaging area of the camera.

The light sources may extend in the direction of length of the chain in front of the camera such that they cause the chain extended in front of the camera to be evenly illuminated in the imaging area. The direction of length of the chain may be the vertical direction, when the chain is supported from above and extends downwards in front of the camera. The light source may be implemented by strips of Light Emitting Diodes (LEDs). An advantage of LEDs is their relatively low power consumption. Suitable light sources for the type of the camera should be used. Particularly, different types of cameras may have different types of sensors, e.g. a Charge Couple Device (CCD) and Complementary Metal Oxide Silicon (CMOS) sensors.

The guiding means position the chain in front of the camera such that holes of consecutive chain links are visible to the camera. The guiding means also damp vibrations in the chain such that the chain may travel regularly in front of the camera. The guiding means may comprise two pairs of guide blocks 404 that are arranged at a distance from each other along the travel path of the chain positioned in front of the camera, and the guide blocks have profiles that each have a corner a adapted to fit a profile of the chain, the guide blocks extend along the travel path, and the said corners in the pairs of guide blocks are facing each other, whereby consecutive chain links are engaged by different sides of each guide block. The guiding means may be arranged from each other at a distance of at least a length of the imaging area of the camera in the direction of the travel path. Each chain link is engaged by one of the sides that form the corner a. The corners of the guide blocks cause a chain link entering between the guide blocks to turn to such a position that the hole of the chain link is visible to the camera. Consecutive chain links may be turned around an axis of the chain, e.g. in the vertical direction, such that the consecutive chain links may be engaged by different sides that form the corner a in the guide block.

The profile of the chain may be formed by cross-sections of the consecutive chain links, whereby the corner a in the guide blocks may be determined on the basis of the angle between the cross-sections of the consecutive chain links. Accordingly, the profile of the guide blocks may include at least three sides that include two sides forming the corner a and one side for attaching the guide block to its position in a support structure. Examples of the profiles for the guide block comprise a triangle or a polygon. The corner adapted to fit the profile of the chain may have an angle of substantially 90 degrees, for example. However, the angle may be different depending on the chain profile. Accordingly, the dimensions of the guide blocks may be adapted to different sizes of chains.

The pairs of guide blocks may be arranged at a vertical distance from each other along the travel path of the chain such that the guide blocks are out of the imaging area of the camera. In this way the camera may be prevented from focusing on the guide blocks. Support structures may be arranged for positioning the guide blocks.

In an embodiment the guiding means may be toggled such that they may be turned to the travel path for condition inspection of the chain, and away from the travel path such that positioning the chain in front of the camera to be engaged by the guide blocks may be facilitated.

Figure 5:
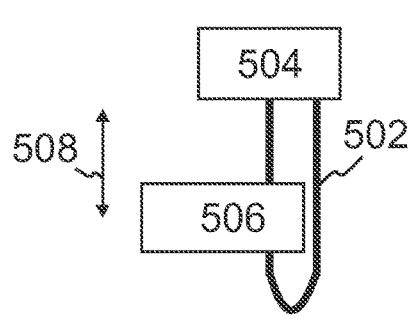
FIG. 5 illustrates inspecting a condition of a chain connected movable to a hoisting device according to an embodiment.

FIG. 5 illustrates inspecting a condition of a chain 502 connected movable to a hoisting device 504 according to an embodiment. The chain may have a travel path 508 along which the chain may be connected movable to the hoisting device. The travel path may be formed by a direction, where the chain is extended, when the chain is used, e.g. for hoisting loads. In a hoisting device the travel path may be formed by the vertical direction in which the chain is extended by the gravity. An arrangement 506 for inspecting a condition of the chain described in an embodiment may be positioned on the travel path of the chain. In this way the chain may be positioned in front of the camera by the guiding means and the chain may be driven past the camera by the hoisting device. The chain may be in a loop, whereby the whole chain may be driven through the arrangement by the hoisting device. It is possible to use the arrangement for condition inspection of the chain even if the chain is not looped, but then it is possible that a portion of the chain cannot be driven past the camera and inspected. The condition of the portion of the chain not driven through the arrangement should be evaluated at least manually by an experienced professional to evaluate the condition of the remaining portion of the chain and to arrive in an understanding of the condition of the whole chain. However, even if at least a portion of the chain is driven through the arrangement, the condition of the portion driven through the arrangement is fast and accurate based on measurements of individual chain links provided by the arrangement.

A method for condition inspection according to an embodiment may comprise disconnecting a chain 502 installed to a hoisting device from devices such as a hook that are attached to the chain during normal use of the chain, e.g. during load handling. Free ends of the chain may be connected into a loop by a connector and the chain may be positioned by the guiding means in front of the camera of the arrangement according to an embodiment. The chain may be driven past the camera by the hoisting device.

Figure 6A:
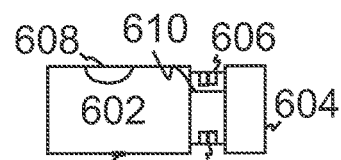
FIGS. 6a, 6b and 6c illustrate a mobile arrangement for inspecting a condition of a chain according to an embodiment.
Figure 6B:
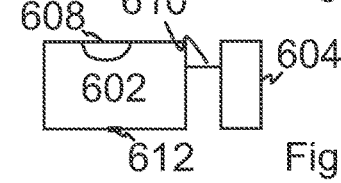
Figure 6C:
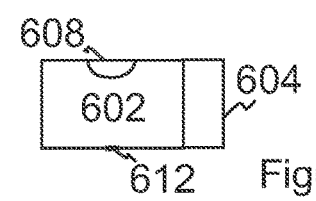

FIGS. 6a, 6b and 6c illustrate a mobile arrangement for inspecting a condition of a chain according to an embodiment. The mobile arrangement follows the structure and operation described above for an arrangement for inspecting a condition of a chain above.

The mobile arrangement may comprise a housing having at least two portions 602, 604 that may be movable with respect to each other. In an embodiment, the mobile arrangement may be a portable case, where one of the housings may have a handle 608 for carrying the case. In an embodiment, one of the housings may have a mounting point 612 for a tripod. The mounting point may be a threaded hole, where the tripod may be connected by threads. In this way the arrangement may be supported to a height above the ground or any other surface.

The portions may be connected movable by one or more rails 610. FIG. 6a illustrates the mobile arrangement in an open position, where a travel path for a chain is formed by guiding means 606 that may position a chain in front of the camera such that holes of consecutive chain links are visible to the camera. In the open position the portions are separate by a distance that allows a chain to travel between the portions. One of the portions 602 may include the camera such that and may have its focus point set on the travel path of the chain between the portions.

FIG. 6b illustrates the mobile arrangement in an intermediate position, where the portions of the housing are separated by a distance, but the guiding means are toggled into the housing such that the portions may be moved towards each other for closing the arrangement.

FIG. 6c illustrates the mobile arrangement in a closed position, where the portions of the housing are against each other such that a chain cannot enter between the portions and the arrangement is closed. In this position the arrangement is protected when it is not used for condition inspection of the chain, e.g. during transportation.

In the mobile arrangement, a display and/or other devices providing user input or output functionality may be installed on the housing, for example on the top of the housing for displaying information in condition inspection of the chain.

FIG. 7 illustrates a user interface 702 in an arrangement according to an embodiment. The user interface may be an area of a display in a display device. The user interface may include elements of visual information that may be displayed on the display. The elements of visual information are illustrated by the items illustrated in FIG. 7. The user interface may be generated in the arrangement on the basis of information such as images, counter values, measured characteristics and/or desired characteristics of the chain. The user interface may be displayed for example on a display in the arrangement of FIG. 3. User interface data representing the user interface or one or more items of the user interface may be generated in the controller 304 and transmitted to the display 302 for displaying to a user. In one example the user interface may be implemented as a web page that may be, for example hosted by a server functionality implemented in the arrangement. The functionalities of the user interface, for example selecting items of the user interface, may be provided by a web browser displaying the web page representing the user interface. The display may be a display of a laptop computer or a touch screen of a tablet computer.

The user interface may comprise at least one element 704, referred to as a chain portion, for displaying a plurality of chain links of the inspected chain. The chain links displayed on the chain portion may be selectable. At least one of the elements of the user interface may be a measurement result portion 710, 712 for displaying values or images of one or more characteristics of the chain link selected in the in the chain portion. In this way characteristics of individual chain links may be inspected. The images of one or more characteristics may be images of the chain link, where the characteristics may be highlighted for example by measurement points of the characteristics.

In an embodiment, the user interface may further comprise a zoom image region 714. The characteristics displayed in the measurement result portion 710 may be selectable such that the zoom image region is caused to display a zoomed image of the chain link, when a characteristic of the chain link is selected in the measurement result portion. A zoomed image of the chain link may include only a portion of the chain link. Preferably the portion of the chain link in the zoomed image includes one or more measurement points of the selected characteristic.

In an embodiment the user interface may comprise one or more control elements 716, 718 that when selected cause the chain portion 704 to display at least one chain link that has a condition that does not meet one or more desired characteristics. In order to determine whether the characteristics of the chain link meet the desired characteristics, the characteristics of the chain link obtained from the images may be compared to desired characteristics of the chain links for determining a condition of each individual chain link as described above with reference to FIG. 3.

The chain portion 704 may display chain links of the inspected chain 706 and condition information 708a, 708b, 708c of individual chain links. The chain portion may allow displaying all the chain links of the chain by a scrolling functionality of the user interface, where a portion of the chain is visible at a time and the chain may be scrolled up and down similar to the scrolling functionality in graphical user interface in present day operating systems and applications such as web browsers and word processors, for example. The individual chain links may be illustrated by dashes of the dashed line that illustrates the chain. The condition information may be displayed by an item connected to the corresponding chain link or on top of the corresponding chain link. The condition information item may be for example a circle. The condition information item may indicate a condition of the chain link by a colour of the condition information item. A red colour may indicate a chain link that does not meet one or more desired characteristics of the chain link. A yellow colour may indicate worn chain link that still meet the characteristics but whose characteristics are substantially different from the characteristics of a new chain. A green colour may indicate that the chain link is in good condition. Preferably condition information is displayed only for the chain links of a specific condition in the chain portion. In this way the area of the chain portion may be kept relatively small. When condition information items only for chain links that do not meet the desired characteristics are displayed, the chain links that are in critical condition may be identified easily.

The items representing the chain links may be selectable such that selecting an item representing a chain link causes displaying an image of the chain link taken by the camera in the measurement result portion 710. A number '78', '79', '79' of the chain link may be displayed in the chain portion next to the chain link as a separate item and/or as a part of the condition information. A combination of condition information and a number of the chain link may be the number of the chain link on a red background indicating the condition. A connecting line may connect the number of the chain link to the item representing the chain link and/or the condition information of the chain link.

In the measurement result portion 712 values of the characteristics may be displayed for the whole chain and/or for an individual chain link, when the chain is selected in the chain portion. Preferably the measurement result portion may display measurement results of the chain link corresponding to a selected item representing a chain link in the chain portion.

One or more characteristics measured from the chain link may be displayed in the image displayed in the measurement result portion 710. The characteristics may be displayed by lines that indicate measurement points for characteristics of the chain link. The measurement points may comprise edges of the chain link. In the illustration of FIG. 7, a gap 'S', a link length 'L' and their corresponding lines are illustrated.

The zoom image region 714 may display an enlarged portion of the image displayed in the measurement result portion 710. The portion of the image may be defined by at least one characteristic displayed in the image 710. Preferably, the zoom image region may display at least one measurement point of the characteristic. The portion of the image to be displayed in the zoom image region may be determined by a selection of the characteristic displayed on the image in the measurement result portion. It should be appreciated that the selected characteristic may be defined directly by the selected characteristic or indirectly by a measurement point corresponding to the characteristic or a line corresponding to the characteristic.

The control element may comprise one or more selectable buttons 716, 718 that may be used to control the chain portion. At least one of the buttons may cause the chain portion to display a portion of the chain including a chain link that has a condition that does not meet one or more desired characteristics of the chain link. When two buttons are provided, selection of one of the buttons may cause the chain portion to display a chain link that has a condition that does not meet one or more desired characteristics upwards from a current position of the chain. Similarly, the other button may provide that a chain link that has a condition that does not meet one or more desired characteristics downwards from a current position of the chain. The upwards and downwards directions define directions towards opposite directions along the chain.

FIGS. 8 and 9 illustrate examples of guiding means according to embodiments. Referring to FIG. 8, the guiding means 804a, 804b and a chain 806 guided by the guiding means are illustrated as viewed from above. The guiding means is capable of positioning chains of variable sizes. The guiding means may comprise guide blocks capable of positioning the chain between the guide blocks and at least one of the guide blocks has a suspension 808 such that the guide block with the suspension may be moved to variable distances from the opposing guide block. The chain positioned between the guide blocks causes the guide blocks to be separated sufficiently to allow fitting the chain between the guide blocks. Accordingly, the distance between the guide blocks may be determined by the size of the chain and in this way chains of variable sizes may be positioned between the guide blocks. It should be appreciated that both of the guide blocks may have suspensions such that both guide blocks may be capable of adapting the distance between the guide blocks. The guide blocks may be connected to a fixed structure 810 for example to a housing in an arrangement according to an embodiment, whereby the suspension of the guide block provides that the guide block may be moved between the opposing guide block and the fixed structure. An example of guide blocks 404 capable of positioning the chain is described with reference to FIGS. 4a and 4b.

FIG. 9 illustrates guiding means capable of damping vibrations and swinging movement. The guiding means comprise guide blocks 904a, 904b capable of positioning the chain between the guide blocks and the guide blocks have sloped ends. The guide blocks may have sloped ends 908a, 908b such that the distance between guide blocks is large $d_l$ at the tips of the guide blocks and the distance $d_s$ is smaller in a direction away from the tips along the travel path of the chain between the guide blocks. The tips of the guide blocks may be the lower and/or upper tips. Having both ends sloped provides that the vibrations and swinging may be damped in both ends of the guide blocks and the chain may travel through the guide blocks upwards or downwards direction. Accordingly, preferably at least the ends of the guide blocks, where the chain enters between the guide blocks may be sloped for damping vibrations and swinging movement. An example of guide blocks 404, 804a, 804b capable of positioning the chain is described with reference to FIGS. 4a, 4b and 8.

FIG. 10 illustrate a structure of arrangement according to an embodiment. The structure facilitates positioning a chain in front of the camera such that holes of consecutive chain links are visible to the camera. The arrangement may comprise a housing having at least two portions 1002, 1004 that may be movable with respect to each other such that the chain may be positioned in front of the camera within the housing. The portions may be connected movable by one or more hinges 1006. The arrangement may comprise guiding means 1008 for positioning the chain in front of the camera such that holes of consecutive chain links are visible to the camera. The housing is illustrated in an open position, where one of the portions is turned sidewards. In the illustration the sidewards is into the page. In the open position, the chain to be inspected may be positioned to the guide guiding means. When the housing is closed the chain positioned to the guiding means may be moved in front of the camera such that holes of consecutive chain links are visible to the camera.

In an embodiment, an arrangement according to an embodiment may have a user input and output functionality. The user output functionality may be provided by a display. The user input functionality may allow a user to control the arrangement, for example to start and stop taking images by the camera and entering commands to the arrangement. The commands may comprise selections and/or activations of elements displayed on a user interface of the arrangement. The user input functionality may be provided by devices including, button(s), keyboard, a computer mouse and other computer peripherals. The user output functionality may be provide by a touch screen 1010, whereby the user input functionality may be provided by the touches and gestures of the user on the user interface displayed on the touch screen. Devices providing the user input and output functionality may be connected to a controller, for example in FIG. 3, by a suitable interface. Examples of the interfaces comprise electrical connections for example a computer bus and video interfaces such as High-Definition Multimedia Interface (HDMI) and Video Graphic Array (VGA) interfaces.

In an embodiment, an arrangement according to an embodiment may have output functionality, for example a speaker, capable of generating at least one sound for indicating a condition of the chain link. The speaker may be provided for example in a tablet computer serving as the display 302 of the arrangement. The output functionality may generate a sound for indicating that a chain link meets one or more desired characteristics and/or another sound for indicating that the chain link fails to meet one or more desired characteristics. Accordingly, a sound may be played for each chain link of the chain being inspected by the arrangement. In another example a sound may be played for such chain links that fail to meet one or more of the desired characteristics. In this way sonification of the chain link condition may be utilized in the inspection of the chain such that the person making the inspection may observe the progress of the inspection by listening to the sounds generated based on the conditions of the chain links. The sound for indicating a failure to meet a desired characteristic may be for example a low tone or a series of low tones. The sound for indicating that a chain link meets a desired characteristic may be for example a high tone or a series of high tones. Accordingly, different condition levels, e.g. corresponding to green, yellow and red conditions in the user interface, may be indicated by different sounds.

In order to determine whether the characteristics of the chain link meet the desired characteristics, the characteristics of the chain link obtained from the images may be compared to desired characteristics of the chain links for determining a condition of each individual chain link as described above with reference to FIG. 3.

According to an embodiment, an arrangement, or a part of the arrangement, for example a camera 306, a display 302 or a counter 308 may comprise processing means configured to carry out any of the embodiments described herein. The processing means may be formed by at least one controller/processor 304 and a memory. The processing means may be a computer or a part of a computer.

In an embodiment there is provided a computer program comprising computer program code for execution on a computer to cause one or more functionalities according to an embodiment, when said product is run on a computer. The computer program may be embodied on a computer-readable storage medium.

In an embodiment there is provided a computer program product for a computer, comprising a computer program according to an embodiment.

An embodiment concerns a computer program embodied on a computer-readable storage medium, the computer program comprising program to execute a process comprising a method according an embodiment.

Embodiments as described may also be carried out in the form of a computer process defined by a computer program. The computer program may be in source code form, object code form, or in some intermediate form, and it may be stored in some sort of carrier, which may be any entity or device capable of carrying the program. For example, the computer program may be stored on a computer-readable storage medium. The computer-readable storage medium may be a computer program distribution medium readable by a computer or a processor. The computer-readable storage medium may be, for example but not limited to, a record medium, computer memory, read-only memory, electrical carrier signal, telecommunications signal, and software distribution package, for example.

The techniques described herein may be implemented by various means so that an arrangement implementing one or more functions described with an embodiment comprises not only prior art means, but also means for implementing the one or more functions of a corresponding arrangement or apparatus described with an embodiment and it may comprise separate means for each separate function, or means may be configured to perform two or more functions. For example, these techniques may be implemented in hardware (one or more apparatuses), firmware (one or more apparatuses), software (one or more modules), or combinations thereof. A hardware implementation may be through one or more circuits, for example Application Specific Circuits (ASICs). For a firmware or software, implementation can be through modules (e.g., procedures, functions, and so on) that perform the functions described herein. The software codes may be stored in any suitable, processor/computer-readable data storage medium(s) or memory unit(s) or article(s) of manufacture and executed by one or more processors/computers. The data storage medium or the memory unit may be implemented within the processor/computer or external to the processor/computer, in which case it can be communicatively coupled to the processor/computer via various means as is known in the art.

It will be obvious to a person skilled in the art that, as the technology advances, the inventive concept can be implemented in various ways. The invention and its embodiments are not limited to the examples described above but may vary within the scope of the claims.

The invention claimed is:

1. An arrangement for inspecting a condition of a chain, comprising:
   a camera;
   a guide for positioning a chain comprising a plurality of consecutive chain links interconnected by loops of the consecutive links, such that loops of the consecutive links travel through holes formed by the loops, in front of the camera such that holes of consecutive chain links are visible to the camera;
   a counter for counting chain links in the chain; and a reference element, the reference element located in an imaging area of the camera, wherein the reference element and the holes of the consecutive chain links are visible in images generated by the camera, wherein the camera is operatively connected to the counter such that the camera is caused to take overlapping images from the chain links on update of the counter, wherein the counter is an optical device capable of emitting a light beam, for example of laser light, comprising a light source capable of emitting a light beam and a light receiver capable of receiving the light beam from the light source, and wherein a disconnection of the light beam causes controlling the camera to take the overlapping images from the chain links.

2. The arrangement for inspecting a condition of a chain according to claim 1, wherein the guide comprise two pairs of guide blocks that are arranged at a distance from each other along the travel path of the chain positioned in front of the camera, and the guide blocks have profiles that each have a corner adapted to fit a profile of the chain, the guide blocks extend along the travel path, and the said corners in the pairs of guide blocks are facing each other, whereby consecutive chain links are engaged by different sides of each guide block.

3. The arrangement for inspecting a condition of a chain according to claim 1, wherein the guide comprise guide blocks capable of positioning the chain between the guide blocks and at least one of the guide blocks has a suspension such that the guide block may be moved to variable distances from the opposing guide block.

4. The arrangement for inspecting a condition of a chain according to claim 1, wherein the guide comprise guide blocks capable of positioning the chain between the guide blocks and the guide blocks have sloped ends such that the distance between guide blocks is large at the tips of the guide blocks and the distance is smaller in a direction away from the tips along the travel path of the chain between the guide blocks.

5. The arrangement for inspecting a condition of a chain according to claim 1, wherein a frame rate of the camera is adapted to the speed of the chain travelling in front of the camera for taking the overlapping images from consecutive chain links of the chain.

6. The arrangement for inspecting a condition of a chain according to claim 1, wherein the counter is formed by one or more photocells.

7. The arrangement for inspecting a condition of a chain according to claim 1, comprising:
a display operatively connected to the counter such that the display is caused to display a value of the counter during chain links are traveling guided by the guide.

8. The arrangement for inspecting a condition of a chain according to claim 1, comprising a controller operatively connected to the camera to receive images taken by the camera from the chain, and caused to determine, on the basis of the received images, for each chain link one or more characteristics of the chain links including at least one of a gap, a link length and a thickness.

9. The arrangement for inspecting a condition of a chain according to claim 8, further comprising a display operatively connected to the counter such that the display is caused to display a counter value for the chain link and the determined characteristics of the chain link.

10. The arrangement for inspecting a condition of a chain according to claim 1, comprising:
a back plate on an opposite side of the chain than the camera and arranged at a distance beyond a focus point of the camera.

11. The arrangement for inspecting a condition of a chain according to claim 10, comprising light sources next to the camera and directed to the chain and at least one light source arranged to illuminate the back plate.

12. The arrangement for inspecting a condition of a chain according to claim 1, wherein the reference element is positioned in front of the camera and with respect to the chain in front of the camera such that at least one reference edge in the reference element is aligned to the chain for measuring one or more characteristics of the chain links including at least one of a gap, a link length and a thickness.

13. The arrangement for inspecting a condition of a chain according to claim 12, wherein the characteristics of the chain links are determined on the basis of the overlapping images of consecutive chain links.

14. The arrangement for inspecting a condition of a chain according to claim 1, wherein the arrangement is formed as a portable case.

15. The arrangement for inspecting a condition of a chain according to claim 1, wherein the arrangement includes a mounting point for a tripod.

16. The arrangement for inspecting a condition of a chain according to claim 1, further comprising a user interface, said user interface comprising elements for displaying visual information, wherein at least one of the elements is a chain portion for displaying a plurality of chain links of the chain, wherein the chain links displayed on the chain portion are selectable, and at least one of the elements of the user interface is a measurement result portion for displaying values or images of one or more characteristics of the chain link selected in the in the chain portion.

17. The arrangement for inspecting a condition of a chain according to claim 16, wherein the user interface further comprises a zoom image region and the characteristics displayed in the measurement result portion are selectable such that the zoom image region is caused to display a zoomed image of the chain link, when a characteristic of the chain link is selected in the measurement result portion.

18. The arrangement for inspecting a condition of a chain according to claim 16, wherein the user interface comprises one or more control elements that when selected cause the chain portion to display at least one chain link that has a condition that does not meet one or more desired characteristics.

19. The arrangement for inspecting a condition of a chain according to claim 8, wherein at least one sound is played for indicating that a condition of the chain link meets one or more desired characteristics or fails to meet one or more desired characteristics of the chain.

20. A method for inspecting a condition of a chain connected movable to a hoisting device by the arrangement according to claim 1, said method comprising the steps of:
positioning the chain in front of the camera by the guide; and
driving the chain past the camera by the hoisting device.

* * * * *